US007359616B2

(12) United States Patent
Suzuki et al.

(10) Patent No.: US 7,359,616 B2
(45) Date of Patent: Apr. 15, 2008

(54) SERVICE PROVIDING APPARATUS, SERVICE PROVIDING METHOD, RECEIVING TERMINAL APPARATUS, RECEIVING METHOD, AND SERVICE PROVIDING SYSTEM

(75) Inventors: Toru Suzuki, Chiba (JP); Nobuhiro Hisaoka, Tokyo (JP); Junichi Kurihara, Kanagawa (JP); Tatsuya Akashi, Tokyo (JP); Junko Ozaki, Kanagawa (JP); Mika Munenaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1804 days.

(21) Appl. No.: 09/853,845

(22) Filed: May 11, 2001

(65) Prior Publication Data

US 2002/0015575 A1 Feb. 7, 2002

(30) Foreign Application Priority Data

May 12, 2000 (JP) .......................... P2000-139677

(51) Int. Cl.
*G11B 27/00* (2006.01)
*H04N 5/93* (2006.01)
*H04N 5/91* (2006.01)

(52) U.S. Cl. .......................................... 386/52; 386/68

(58) Field of Classification Search ................. 386/55, 386/68, 52; 345/428, 619, 723; 709/246, 709/218, 245; 711/156; 382/107; 715/500.1, 715/513; 358/335
See application file for complete search history.

(56) References Cited

U.S. PATENT DOCUMENTS

| | | | | |
|---|---|---|---|---|
| 5,267,351 | A | | 11/1993 | Reber et al. |
| 5,537,528 | A | | 7/1996 | Takahashi et al. |
| 5,543,930 | A | * | 8/1996 | Takano ........................ 386/46 |
| 5,760,767 | A | | 6/1998 | Shore et al. |
| 5,829,044 | A | * | 10/1998 | Sono .......................... 711/156 |
| 6,029,194 | A | * | 2/2000 | Tilt ............................ 725/94 |
| 6,151,017 | A | * | 11/2000 | Suzuoka et al. ......... 715/500.1 |
| 6,510,278 | B1 | | 1/2003 | Takayama |
| 6,577,311 | B1 | * | 6/2003 | Crosby et al. .............. 345/428 |
| 6,597,860 | B2 | * | 7/2003 | Song et al. ................... 386/68 |
| 6,618,491 | B1 | * | 9/2003 | Abe .......................... 382/107 |
| 6,704,029 | B1 | * | 3/2004 | Ikeda et al. ................. 715/723 |
| 7,134,074 | B2 | * | 11/2006 | Munetsugu et al. ........ 715/513 |
| 2004/0049598 | A1 | * | 3/2004 | Tucker et al. ............... 709/246 |

FOREIGN PATENT DOCUMENTS

| | | |
|---|---|---|
| EP | 0 945 864 A2 | 9/1999 |
| JP | 10 074381 A | 3/1998 |
| WO | WO 9852356 | 11/1998 |
| WO | WO 99/03273 | 1/1999 |
| WO | WO 00/79485 A1 | 12/2000 |
| WO | WO 01/28238 A2 | 4/2001 |

* cited by examiner

*Primary Examiner*—Thai Q. Tran
*Assistant Examiner*—Hung Dang
(74) *Attorney, Agent, or Firm*—Bell, Boyd & Lloyd LLP

(57) ABSTRACT

A service providing apparatus for providing an editing environment for video data recorded on a record medium that is sent is disclosed, that includes a part for creating index pictures using the video data that is sent and transmitting the created index pictures from a first computer to a second computer through a network, and an editor for editing the video data corresponding to edit commands transmitted from the second computer to the first computer through the network as a displayed result of the transmitted index pictures.

33 Claims, 5 Drawing Sheets

SERVER
5
10: NETWORK
COMPUTER
3
EDITING SOFTWARE PROGRAM
2
DIGITAL CAMERA
1
FORMAT CONVERTER
4
COMPUTER
6
EDITING SOFTWARE PROGRAM
7
COMPUTER
8
EDITING SOFTWARE PROGRAM
9

| SCENE | SCENE START PICTURE | SCENE END PICTURE | SCENE START TIME | SCENE END TIME |
|---|---|---|---|---|
| 001 | PICTURE 1 | PICTURE 2 | 0'00'' | 1'00'' |
| 002 | PICTURE 3 | PICTURE 4 | 1'00'' | 2'00'' |
| 003 | PICTURE 5 | PICTURE 6 | 3'00'' | 4'00'' |
| 004 | PICTURE 7 | PICTURE 8 | 4'00'' | 5'00'' |

Fig. 3

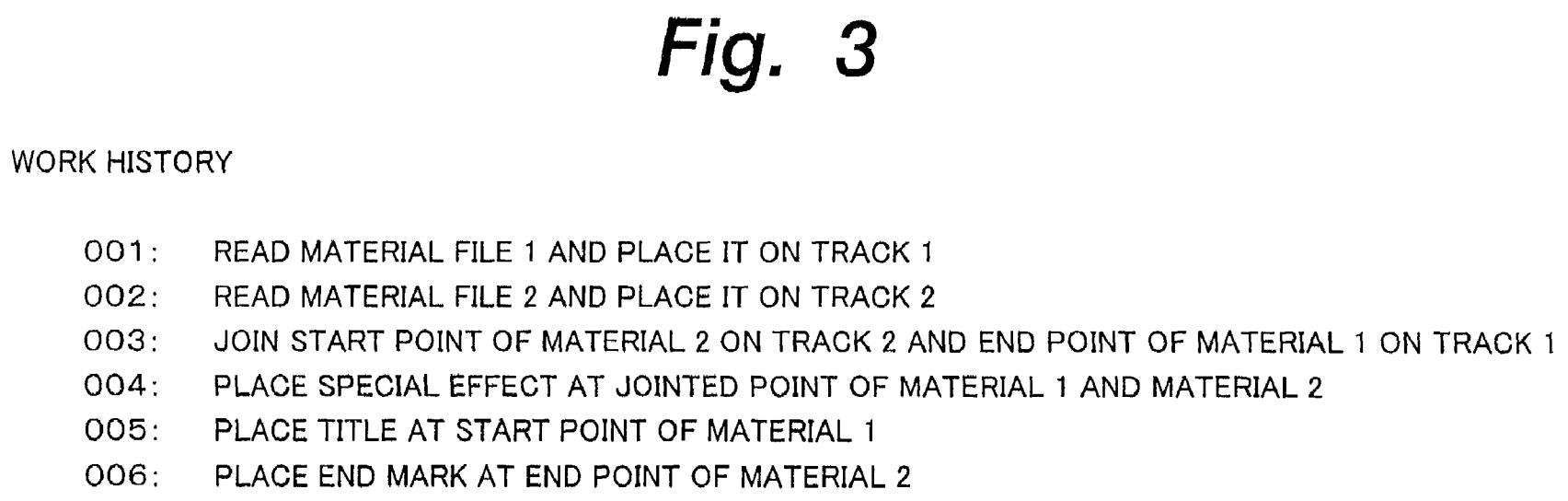

WORK HISTORY

001: READ MATERIAL FILE 1 AND PLACE IT ON TRACK 1
002: READ MATERIAL FILE 2 AND PLACE IT ON TRACK 2
003: JOIN START POINT OF MATERIAL 2 ON TRACK 2 AND END POINT OF MATERIAL 1 ON TRACK 1
004: PLACE SPECIAL EFFECT AT JOINTED POINT OF MATERIAL 1 AND MATERIAL 2
005: PLACE TITLE AT START POINT OF MATERIAL 1
006: PLACE END MARK AT END POINT OF MATERIAL 2

MEMBER
SERVER 5
COMPUTER 6
COMPUTER 8
S1
SEND ORIGINAL PICTURE AND CONVERT FORMAT
S2
TRANSMIT INDEX PICTURES
S3
TRANSMIT INDEX PICTURES
TRANSMIT EDIT COMMANDS
TRANSMIT WORK HISTORY
S4
TRANSMIT PRE-EDITED HIGH RESOLUTION PICTURE
S5
SEND EDITED PICTURE
TRANSMIT EDITED PICTURE
T

| SCENE | SCENE START PICTURE | SCENE END PICTURE | SCENE START TIME | SCENE END TIME |
|---|---|---|---|---|
| 001 | PICTURE 1 | PICTURE 2 | 0'00'' | 1'30'' |
| 002 | PICTURE 3 | PICTURE 4 | 1'30'' | 5'40'' |
| 003 | PICTURE 5 | PICTURE 6 | 5'40'' | 7'45'' |
| 004 | PICTURE 7 | PICTURE 8 | 7'45'' | 15'30'' |

SERVICE PROVIDING APPARATUS, SERVICE PROVIDING METHOD, RECEIVING TERMINAL APPARATUS, RECEIVING METHOD, AND SERVICE PROVIDING SYSTEM

BACKGROUND OF THE INVENTION

1. Field of the Invention

The present invention relates to a service providing apparatus, a service providing method, a receiving terminal apparatus, a receiving method, and a service providing system that allow video data to be easily edited through a network regardless of the performance of a computer of a user.

2. Description of the Related Art

When video data photographed by a digital camera having a built-in VCR (hereinafter this camera is simply referred to as digital camera) is edited, the user has two choices. The first choice is to buy an expensive video editing device. The second choice is ask a video editing professional to edit video data.

When the user buys such a video editing device, he or she should pay a lot of money. In addition, the user should prepare a wide space for the device. Moreover, the user should pay an expensive running cost for the device.

On the other hand, when the user asks the professional to edit video data, his or her labor cost of the professional is high. In addition, to have the professional edit video data in the manner that the user wants, they should spend time for discussions about video data that is edited.

Although software and hardware are available for allowing the user to easily edit video data, they have limitations of speed and capacity. In addition, as computer technologies are rapidly advancing, software and hardware that the user buys soon become old-fashioned.

SUMMARY OF THE INVENTION

Therefore, an object of the present invention is to provide a service providing apparatus, a service providing method, a receiving terminal apparatus, a receiving method, and a service providing system that allow video data to be easily edited through a network regardless of the performance of a computer of a user.

A first embodiment of the present invention is a service providing apparatus for providing an editing environment for video data recorded on a record medium that is sent, wherein the apparatus includes a part for creating index pictures using the video data that is sent and transmitting the created index pictures from a first computer to a second computer through a network, and an editor for editing the video data corresponding to edit commands transmitted from the second computer to the first computer through the network as a displayed result of the transmitted index pictures.

A second embodiment of the present invention is a service providing method for providing an editing environment for video data recorded on a record medium that is sent, wherein the method includes the steps of creating index pictures using the video data that is sent and transmitting the created index pictures from a first computer to a second computer through a network, and editing the video data corresponding to edit commands transmitted from the second computer to the first computer through the network as a displayed result of the transmitted index pictures.

A third embodiment of the present invention is a receiving terminal apparatus, which includes a receiver for receiving index pictures of video data recorded on a record medium that is sent through a network, and a transmitter for transmitting edit commands corresponding to a displayed result of the index pictures.

A fourth embodiment of the present invention is a receiving method, wherein the method includes the steps of receiving index pictures of video data recorded on a record medium that is sent through a network, and transmitting edit commands corresponding to a displayed result of the index pictures.

A fifth embodiment of the present invention is a service providing system for providing an editing environment for video data recorded on a record medium that is sent from a member, wherein the system includes a part for creating index pictures using the video data that is sent from the member and transmitting the created index pictures from a first computer to a second computer through a network, and an editor for editing the video data corresponding to edit commands transmitted from the second computer to the first computer through the network as a displayed result of the transmitted index pictures.

Video data recorded on a record medium sent from a member to a service providing company can be edited through a network. At that point, the service providing company transmits index pictures of the video data to the member. The member views the index pictures and transmits edit commands for the video data to the service providing company. The service providing company edits the video data corresponding to the edit commands.

Additional features and advantages of the present invention are described in, and will be apparent from, the Detailed Description of the Preferred Embodiments and the Drawings.

DESCRIPTION OF THE DRAWINGS

FIG. 3 is an example of a work history according to the present invention;

DETAILED DESCRIPTION OF THE PREFERRED EMBODIMENTS

Figure 1:
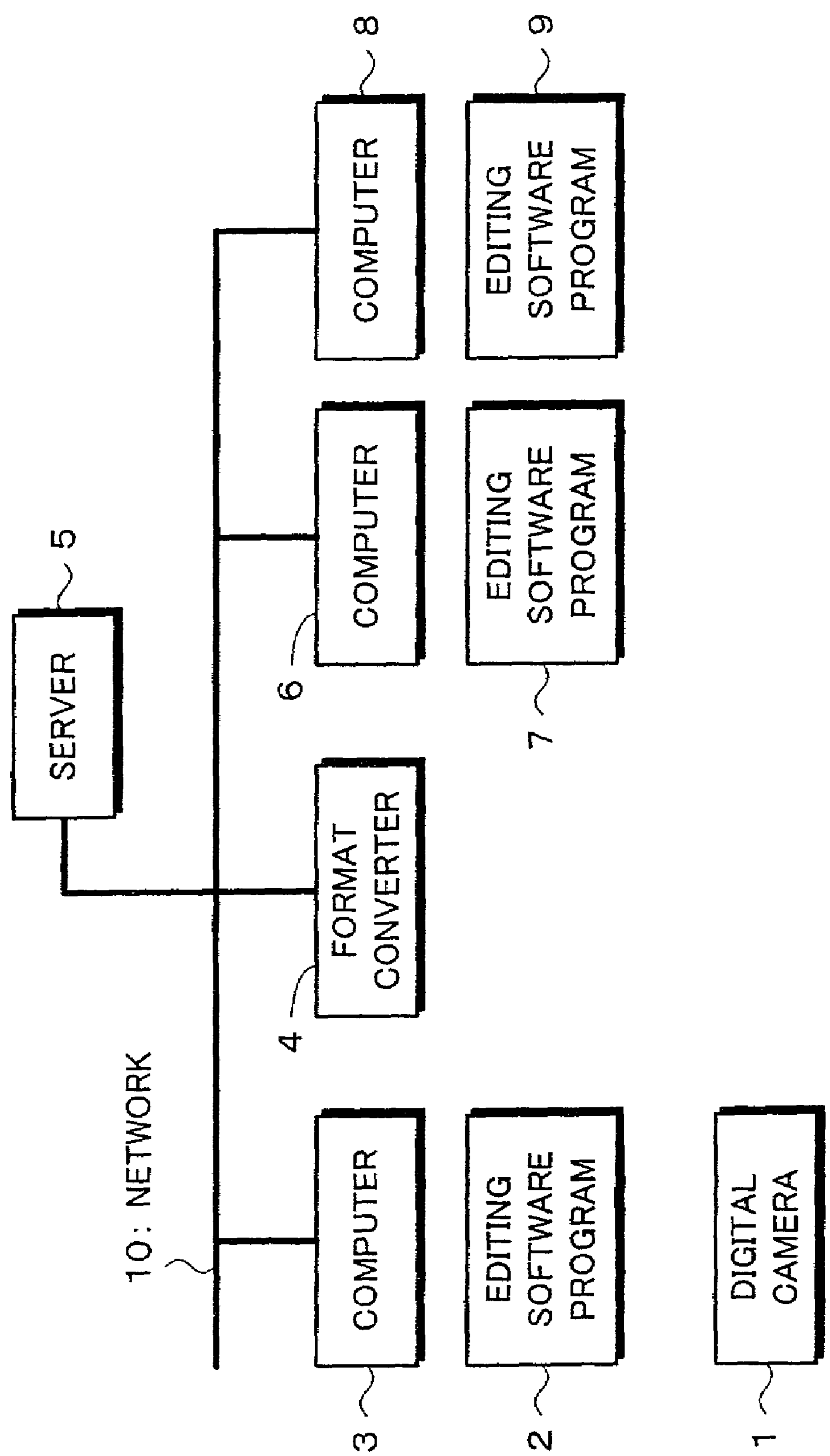
FIG. 1 is a block diagram showing the structure of a service providing system according to an embodiment of the present invention.

Next, with reference to the accompanying drawings, embodiments of the present invention will be described. In those drawings, for simplicity, similar portions are denoted by similar reference numerals and their redundant description is omitted. FIG. 1 shows the structure of an embodiment according to the present invention. In FIG. 1, a member has a digital camera 1, a computer 2, and an editing software program 3. A service providing company has a format converter 4, a server 5, computers 6 and 8, and editing software programs 7 and 9. The computer 2 of the member, the computer 6 of the service providing company, and the server 5 of the service providing company are mutually connected through a network 10.

According to the embodiment of the present invention, for example, when a user asks the service providing company to edit video data that he or she photographed with the digital camera 1, the user records the photographed video data to a record medium and sends the record medium to the service providing company. At that point, the user should be a member of the service providing company or have the right equivalent to the member.

Figures 2A, 2B:
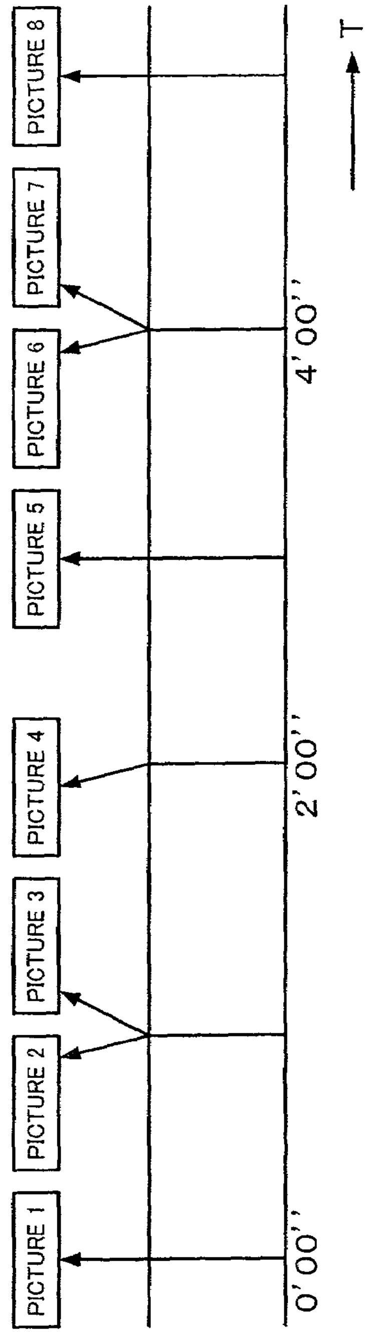
FIGS. 2A and 2B are schematic diagrams showing an example of a database according to the present invention.

The video data recorded on the record medium is converted into a predetermined picture format by the format converter 4 so that the converted video data can be easily handled by computers. For example, the predetermined picture format is the MPEG 2 format (hereinafter, data in the MPEG 2 format is referred to as MPEG 2 data). The MPEG 2 video data is stored to the server 5. At that point, for example, as shown in FIG. 2A, the MPEG 2 video data are extracted at predetermined intervals as index pictures of still pictures. With the extracted index pictures, a database is created.

The database shown in FIG. 2A is composed of a scene number field, a scene start picture field, a scene end picture field, a scene start time field, and a scene end time field. FIG. 2B shows video data recorded on the record medium or MPEG 2 data stored in the server 5 in the chronological direction. Pictures at the start time and the end time of each of predetermined intervals of video data or MPEG 2 data shown in FIG. 2B are extracted as index pictures. With the extracted index pictures, a database shown in FIG. 2A is created. For example, index pictures used for the created database are reduced pictures with low resolution (these pictures are referred to as thumbnail pictures).

The computers 6 and 8 of the service providing company have sufficiently high performances. The editing software programs 7 and 9 have been installed to the computers 6 and 8, respectively. When the member operates the editing software program 3 of the computer 2 connected to the network 10, as will be described later, the editing software program 7 of the computer 6 is controlled. As a result, the member can edit MPEG 2 data.

In such a manner, the service providing company receives a record medium from the member. Video data that is edited has been recorded on the record medium. The record medium is sent by a direct delivery method such as mail or courier service, a delivery system such as a convenience store, or a delivery method using an electronic appliance store. The service providing company reproduces the received video data and converts it into digital data such as MPEG 2 data that computers handle. The service providing company stores the converted digital data to the server 5. At that point, the service providing company creates a database of index pictures of which scenes of the video data are extracted at predetermined intervals.

The member can operate the computer 2 connected to the network 10, access the computer 6 or 8 of the service providing company, and edit the video data that he or she photographed. At that point, when the member edits the video data, the member uses the database of the index pictures shown in FIG. 2A. Thus, since the load applied to the network line is reduced, the member can quickly edit the video data. Although the editing operation requires large computer resources such as a large memory space and a large disk space, since the performances of the computers of the service providing company are sufficiently high, the member can use a large memory space and a disk space. Thus, the user can smoothly edit the video data.

After the member edits the video data using the index pictures, a work history as shown in FIG. 3 is created. After the member has completed the editing operation, original pictures with high resolution are edited using large computer resources. However, this editing operation is executed when the computers of the service providing company are not busy. Thus, the editing operation does not adversely affect the operations of the computers of the service providing company.

Figure 4:
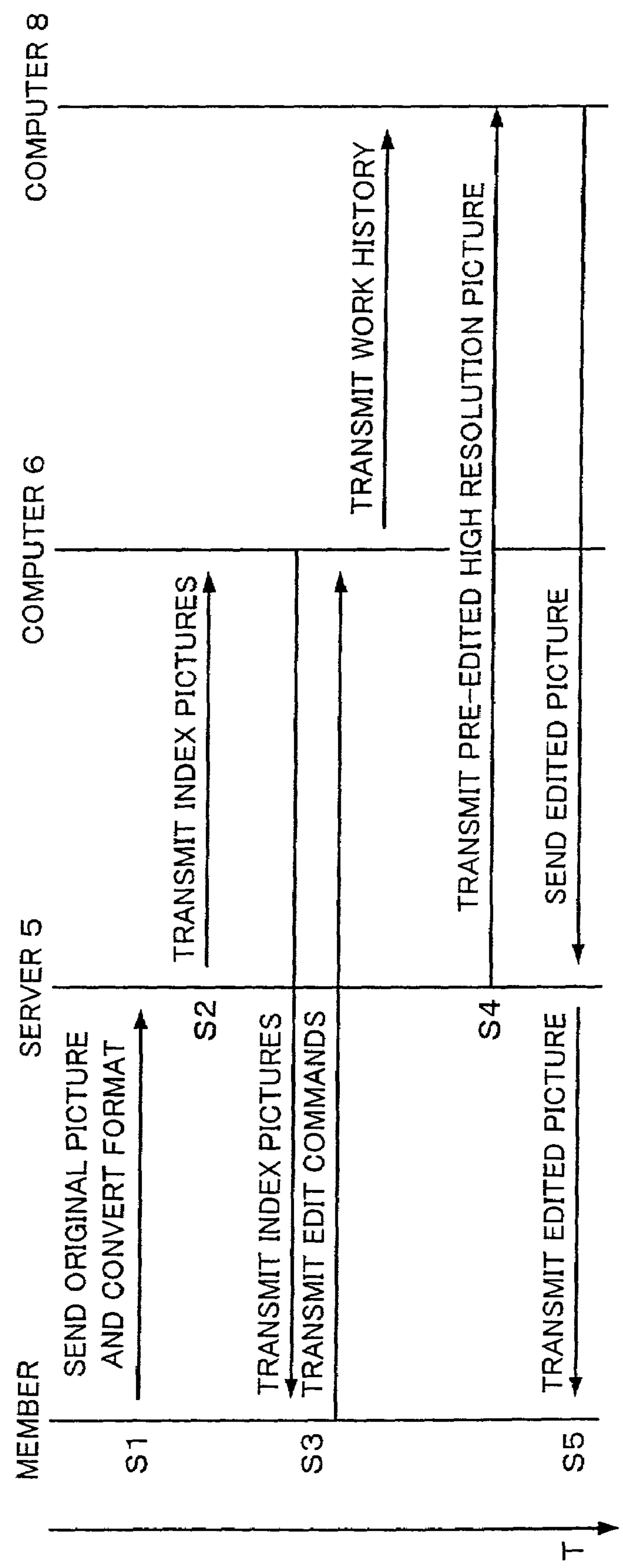
FIG. 4 is a schematic diagram for explaining an example of the operation according to the present invention.

Next, with reference to FIG. 4, the operation of the system according to the embodiment will be described. First of all, the member has selected video data that he or she has photographed and has recorded the selected video data to a record medium. At step S1, the member sends the record medium to the service providing company by mail or courier service. When the member sends the record medium to the service providing company, he or she may use a chain store such as a convenience store or a sales network such as an electronic appliance store. The service providing company converts the received video data into MPEG 2 data using the format converter 4 so that the video data can be easily handled by computers. The service providing company stores the MPEG 2 data to the server 5. In addition, the service providing company creates a database of index pictures of which parts are extracted from the video data or the MPEG 2 data and stores the database to the server 5. As shown in FIG. 2A, the database is composed of a scene number field, a scene start picture field, a scene end picture field, a scene start time field, and a scene end time field. In the database, the interval between the scene start time and the scene end time of each scene is constant.

At step S2, the database stored in the server 5 is transferred to the computer 6.

At step S3, the member operates the editing software program 3 that runs on the computer 2. When the editing software program 3 runs on the computer 2, the computer 2 can control the computer 6 of the service providing company through the network 10. The editing software program 7 runs on the computer 6 and reads the index pictures for the member from the server 5. The member operates the editing software program 7 that runs on the computer 6 and edits the index pictures. At that point, even if the communication speed of the network is not high, since only index pictures whose capacity is low are exchanged between the computer 6 and the computer 2, the load applied to the network is low. Thus, the data can be transmitted in a short time. Since the member views the received index pictures and transmits edit commands corresponding to the index pictures from the computer 2 to the computer 6, the load applied to the computer 2 is low. Thus, the member can quickly edit the video data. Since the computer 6 has sufficient performances, a sufficient memory space, and a sufficient disk space, it can provide a high speed, comfortable editing environment to the member.

At step S4, after the computer 6 has completed the editing operation for the MPEG 2 data, the computer 6 creates the above described work history. The created work history is transferred from the computer 6 to the computer 8. Corresponding to the work history, the editing operation performed by the member can be reproduced. The editing software program 9 runs on the computer 8. The editing software program 9 reads high resolution MPEG 2 data from the server 5 and edits the high resolution MPEG 2 data corresponding to the work history created by the computer 6. The computer 8 is a high speed computer that has a sufficient memory space and a sufficient hard disk space. Thus, the computer 8 can quickly edit the MPEG 2 data. Although the computer 6 and the computer 8 may be structured as one computer, when the computer 8 is a dedicated computer that edits MPEG 2 data, high resolution video data can be edited without deterioration.

At step S5, the MPEG 2 data that has been edited by the computer 8 is stored again to the server 5. The member can download the edited MPEG 2 data to the computer 2 and enjoy the edited MPEG 2 data with the computer 2. Alternatively, the service providing company may convert the edited MPEG 2 data to particular format data, record it on for example a CD-R, and send it to the member.

Instead of index pictures sent from the service providing company, thumbnail pictures may be used for the editing operation. Since thumbnail pictures with various resolutions can be selected, when thumbnail pictures with low resolution are transmitted to a member who uses a low speed line, he or she can quickly perform the editing operation. In contrast, a member can use a high speed line, thumbnail pictures with optimum resolution can be transmitted so that he or she can perform the editing operation in a better environment.

Figures 5A, 5B:
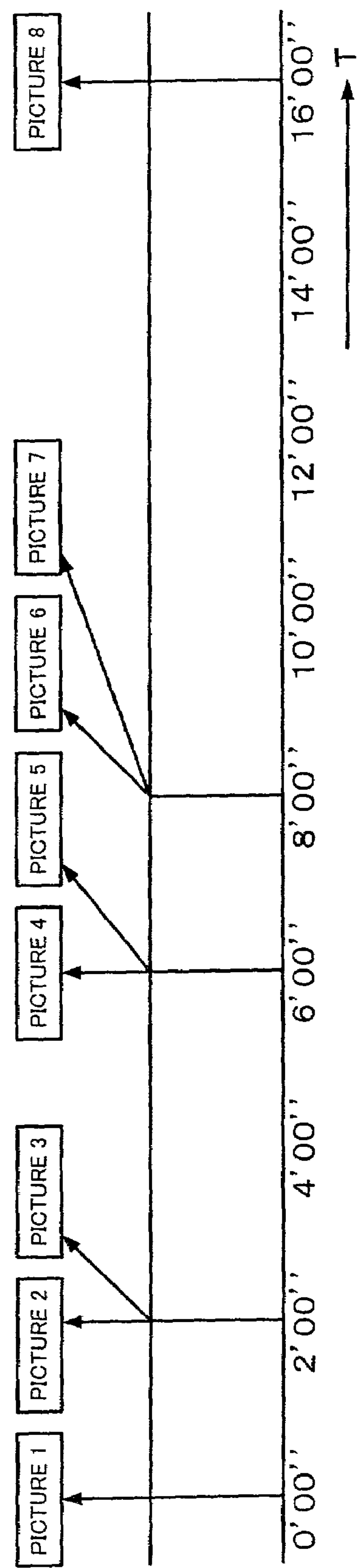
FIGS. 5A and 5B are schematic diagrams showing an example of an index picture database according to the present invention.

According to the embodiment, the database shown in FIG. 2A is used. Alternatively, a database as shown in FIG. 5A may be used. In the database shown in FIG. 5A, scene change portions and particular scene portions are used as index pictures. FIG. 5B shows video data recorded on a record medium or MPEG 2 data stored in the server 5 in the chronological direction. To generate index pictures, scene change portions and particular scene portions may be extracted by an automatic recognizing device or software having an automatic recognizing function.

According to the embodiment of the present invention, the service providing company has the format converter 4 and the server 5. Alternatively, the service providing company may not have the format converter 4 and/or the server 5. In other words, when the member uses a company that has the format converter 4 and/or the server 5 and a company that does not have format converter 4 and/or the server 5, he or she can edit video data as in the above-described embodiment.

According to the embodiment, the format converter 4 converts video data into MPEG 2 data as an example of a picture format that computers can easily handle. In other words, according to the embodiment, any picture format can be used as long as computers can easily handle it.

According to the embodiment, the member uses a record medium so as to send video data to the service providing company. The record medium is, for example, a magnetic tape, an optical disc, an magneto-optical disc, a hard disk drive, or an IC memory. In other words, any record medium can be used as long as video data can be recorded. According to the embodiment, edited video data or edited MPEG 2 data is recorded on a record medium. When the record medium is sent from the service providing company to the member, as an example of the record medium, a CD-R is used. However, any record medium can be used as long as video data or MPEG 2 data can be recorded.

According to the embodiment, the computer of the member and the computers of the computers of the service providing company are connected through a network. The network may be the so-called Internet that uses commercial lines. Alternatively, those computers may be connected through a dedicated line.

According to the embodiment, the member sends video data to the service providing company so as to edit it. Alternatively, the member may send audio data such as music data of which pictures are removed from video data or voices to the service providing company so as to edit the audio data. For example, the member can collect only his or her favorite music programs of a number of musicians.

According to the present invention, a member can remotely operate computers of a service providing company through a network so as to edit video data without the need to prepare an expensive video editing device. In addition, since the service providing company allows its members to use its expensive editing devices, the operation ratios of the devices become high. Thus, the service providing company can provide an editing service to members at low cost.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

We claim as our invention:

1. A service providing apparatus for providing an editing environment for video data recorded on a medium that is sent, the apparatus comprising:

a part for creating index pictures using the video data that is sent and transmitting the created index pictures from a first computer to a second computer through a network; and an editor for editing the video data corresponding to edit commands transmitted from the second computer to the first computer through the network as a displayed result of the transmitted index pictures wherein the index pictures are still pictures extracted from the video data at predetermined intervals; and a part for storing scene data, the scene data including a scene number, scene start picture, scene end picture, scene start time, and scene end time, wherein the scene start picture and the scene end picture are index pictures.

2. A service providing apparatus as claimed in claim 1, further comprising:

a server, wherein the video data is stored to the server.

3. A service providing apparatus as claimed in claim 1, further comprising:

a server, wherein the video data is converted into a predetermined format that the first computer easily handles and the converted video data is stored in the server.

4. A service providing apparatus as claimed in claim 3, wherein the converted video data is MPEG 2 format data.

5. A service providing apparatus as claimed in claim 1, wherein the edited video data is transmitted from the second computer to the first computer through the network.

6. A service providing apparatus as claimed in claim 1, wherein the index pictures are still pictures extracted from particular scenes of the video data.

7. A service providing apparatus as claimed in claim 1, wherein the index pictures are automatically generated.

8. A service providing apparatus as claimed in claim 1, wherein the index pictures are thumbnail pictures composed of reduced pictures with low resolution.

9. A service providing apparatus as claimed in claim 1, wherein the first computer records a history of the transmitted edit commands and edits the video data corresponding to the history of the edit commands.

10. A service providing apparatus as claimed in claim 1, wherein the first computer records a history of the transmitted edit commands, and wherein, after the edit commands have been completely transmitted, the first computer edits the video data corresponding to the history of the recorded edit commands.

11. A service providing apparatus as claimed in claim 1, further comprising:

a third computer, wherein the video data is edited by the third computer corresponding to the recorded edit commands.

12. A service providing method for providing an editing environment for video data recorded on a record medium that is sent, the method comprising the steps of:

creating index pictures using the video data that is sent;

transmitting the created index pictures from a first computer to a second computer through a network; and editing the video data corresponding to edit commands transmitted from the second computer to the first computer through the network as a displayed result of the transmitted index pictures wherein the index pictures are still pictures extracted from the video data at predetermined intervals; and a part for storing scene data, the scene data including a scene number, scene start picture, scene end picture, scene start time, and scene end time, wherein the scene start picture and the scene end picture are index pictures.

13. A service providing method as claimed in claim 12, the method further comprising the step of:

storing the video data in a server.

14. A service providing method as claimed in claim 12, the method further comprising the steps of: converting the video data into a predetermined format that the first computer easily handles; and storing the converted video data in a server.

15. A service providing method as claimed in claim 14, wherein the converted video data is MPEG 2 format data.

16. A service providing method as claimed in claim 12, the method further comprising the step of:

transmitting the edited video data from the second computer to the first computer through the network.

17. A service providing method as claimed in claim 12, wherein the index pictures are still pictures extracted from particular scenes of the video data.

18. A service providing method as claimed in claim 12, the method further comprising the step of: automatically generating the index pictures.

19. A service providing method as claimed in claim 12, wherein the index pictures are thumbnail pictures composed of reduced pictures with low resolution.

20. A service providing method as claimed in claim 12, the method further comprising the steps of: recording a history of the transmitted edit commands via the first computer; and editing the video data corresponding to the history of the edit commands via the first computer.

21. A service providing method as claimed in claim 12, the method further comprising the steps of:

recording a history of the transmitted edit commands via the first computer; and editing, via the first computer and after the edit commands have been completely transmitted, the video data corresponding to the history of the recorded edit commands.

22. A service providing method as claimed in claim 12, the method further comprising the step of:

editing the video data by a third computer corresponding to the recorded edit commands.

23. A service providing system for providing an editing environment for video data recorded on a record medium that is sent form a member, the system comprising:

a part for creating index pictures using the video data that is sent from the member and transmitting the created index pictures form a first computer to a second computer through a network; and an editor for editing the video data corresponding to edit commands transmitted from the second computer to the first computer through the network as a displayed result of the transmitted index pictures wherein the index pictures are still pictures extracted from the video data at predetermined intervals wherein the index pictures are still pictures extracted from the video data at predetermined intervals; and a part for storing scene data, the scene data including a scene number, scene start picture, scene end picture, scene start time, and scene end time, wherein the scene start picture and the scene end picture are index pictures.

24. A service providing system as claimed in claim 23, further comprising:

a server, wherein the video data is stored to the server.

25. A service providing system as claimed in claim 23, further comprising:

a server, wherein the video data is converted into a predetermined format that the first computer easily handles and the converted video data is stored in the server.

26. A service providing system as claimed in claim 25, wherein the converted video data is MPEG 2 format data.

27. A service providing system as claimed in claim 23, wherein the edited video data is transmitted from the second computer to the first computer through the network.

28. A service providing system as claimed in claim 23, wherein the index pictures are still pictures extracted from particular scenes of the video data.

29. A service providing system as claimed in claim 23, wherein the index pictures are automatically generated.

30. A service providing system as claimed in claim 23, wherein the index pictures are thumbnail pictures composed of reduced pictures with low resolution.

31. A service providing system as claimed in claim 23, wherein the first computer records a history of the transmitted edit commands and edits the video data corresponding to the history of the edit commands.

32. A service providing system as claimed in claim 23, wherein the first computer records a history of the transmitted edit commands, and wherein, after the edit commands have been completely transmitted, the first computer edits the video data corresponding to the history of the recorded edit commands.

33. A service providing system as claimed in claim 23, further comprising: a third computer, wherein the video data is edited by the third computer corresponding to the recorded edit commands.

* * * * *